US011204231B1

(12) United States Patent
Patrick (10) Patent No.: US 11,204,231 B1
(45) Date of Patent: Dec. 21, 2021

(54) DEVICE USED FOR ALIGNING A ROTATABLE DRUM

(71) Applicant: Industrial Kiln & Dryer Group, Inc., Louisville, KY (US)

(72) Inventor: Matthew Patrick, Prospect, KY (US)

(73) Assignee: Industrial Kiln & Dryer Group, Inc., Louisville, KY (US)

( * ) Notice: Subject to any disclaimer, the term of this patent is extended or adjusted under 35 U.S.C. 154(b) by 132 days.

(21) Appl. No.: 16/818,028

(22) Filed: Mar. 13, 2020

(51) Int. Cl.
| | |
|---|---|
| *G01C 9/28* | (2006.01) |
| *G01B 5/24* | (2006.01) |
| *G01C 15/10* | (2006.01) |
| *G01C 9/34* | (2006.01) |

(52) U.S. Cl.
CPC ............. *G01B 5/24* (2013.01); *G01C 9/28* (2013.01); *G01C 9/34* (2013.01); *G01C 15/10* (2013.01)

(58) Field of Classification Search
CPC .................................. G01C 9/24; G01C 9/28
USPC ................................................ 33/301, 379
See application file for complete search history.

(56) References Cited

U.S. PATENT DOCUMENTS

| | | | | |
|---|---|---|---|---|
| 3,827,153 A * | 8/1974 | Mitchell | ................. | G01B 5/14 33/610 |
| 4,848,003 A * | 7/1989 | Westphal | ................. | G01C 9/06 33/384 |
| 5,127,167 A * | 7/1992 | Kennedy | ................. | G01C 9/28 33/370 |
| 5,402,579 A * | 4/1995 | Smith | .................... | B25B 5/067 33/334 |
| 5,666,881 A * | 9/1997 | Zanoli | ..................... | B41F 5/20 101/216 |
| 6,242,680 B1 * | 6/2001 | Benton, Jr. | ............ | G10D 13/02 84/411 R |
| 7,511,210 B2 * | 3/2009 | May | ....................... | G10D 13/02 84/413 |
| 9,310,194 B2 * | 4/2016 | Yuhara | ............... | B29C 65/7847 |
| 2005/0108887 A1 * | 5/2005 | Tsai | ...................... | G01B 3/205 33/610 |
| 2021/0189740 A1 * | 6/2021 | Black | ...................... | G01C 9/28 |

* cited by examiner

*Primary Examiner* — George B Bennett
(74) *Attorney, Agent, or Firm* — Duncan Galloway Greenwald PLLC; Theresa Camoriano; Guillermo Camoriano (57) ABSTRACT

A tool for finding a point on the ground that is directly below the bottom dead center of a rotatable drum. The tool includes magnetic wheels that support the weight of the tool as the tool is rolled along the bottom of the drum and a level that indicates when the tool is in the proper position to direct a pointer downwardly to define the point on the ground.

13 Claims, 7 Drawing Sheets

DEVICE USED FOR ALIGNING A ROTATABLE DRUM

BACKGROUND

The present invention relates to a device that can be used for aligning a rotatable drum. Many large, rotating drums, such as industrial dryers, kilns, calciners, and trommels are used in industry. These drums are supported on rollers (trunnions). Proper alignment is important to the overall performance and longevity of the assembly. The drum should be properly aligned with the foundation (the ground) when it is supported on the trunnions. The positions of the trunnions can be adjusted to put the drum into proper alignment.

The reference to "tires" in this specification relates to heavy metal bands, typically of limited width, secured to and located around the circumference of the drum. The support rollers (trunnions), which are mounted on a foundation, are designed to support these tires. The number of tires will vary, depending upon the load to be supported.

In order to properly align the cylindrical drum (which may exceed 600 feet in length and 20 feet in diameter) with its foundation, it is important to find where the center of the drum is when the drum is supported on the trunnions. In the prior art, a technician gains access to the top of the drum and drops down two plumb bobs (or a double ended plumb bob), one over each side of the drum. He marks the points where these plumb bobs touch the foundation or the ground directly beneath the drum. He measures the distance between these two points and then divides the distance by two and measures that distance from one of the points to find a point on the foundation or on the ground that is directly beneath the bottom dead center (BDC) of the drum. He then makes calculations and adjusts the position of the trunnions accordingly to put the drum into proper alignment with its foundation (with the ground).

This prior art procedure is tedious and difficult, as the technician has to get up on top of the drum, which may be 20 feet or more off of the ground. He waits for the long plumb bobs to stop swinging (which may not be possible to do in windy conditions) in order to take his measurements, and then he repeats the procedure every time he adjusts the trunnions, which shifts the position of the drum, until he reaches the proper position of the drum.

SUMMARY

The present invention provides a tool for finding and marking the point on the foundation or ground directly beneath the Bottom Dead Center of the drum which is simple to use and eliminates the difficulties of prior art methods. The tool releasably secures to the convex, arcuate bottom surface of the drum or of the tire. This tool can be rolled along the circumference of the surface to be measured until a level mounted on the tool indicates that the tool is level with the horizon, at which point a pointer directed downwardly from the tool is used to indicate a point on the ground that is directly beneath the BDC (Bottom Dead Center) of the drum or tire being measured. Once that point has been found, if it is not in the desired location, the trunnions can be adjusted until the drum is in the proper position relative to the ground or foundation. As the trunnions are adjusted, the measurement can be repeated quickly and easily until the desired alignment is reached.

DESCRIPTION

Figure 1:
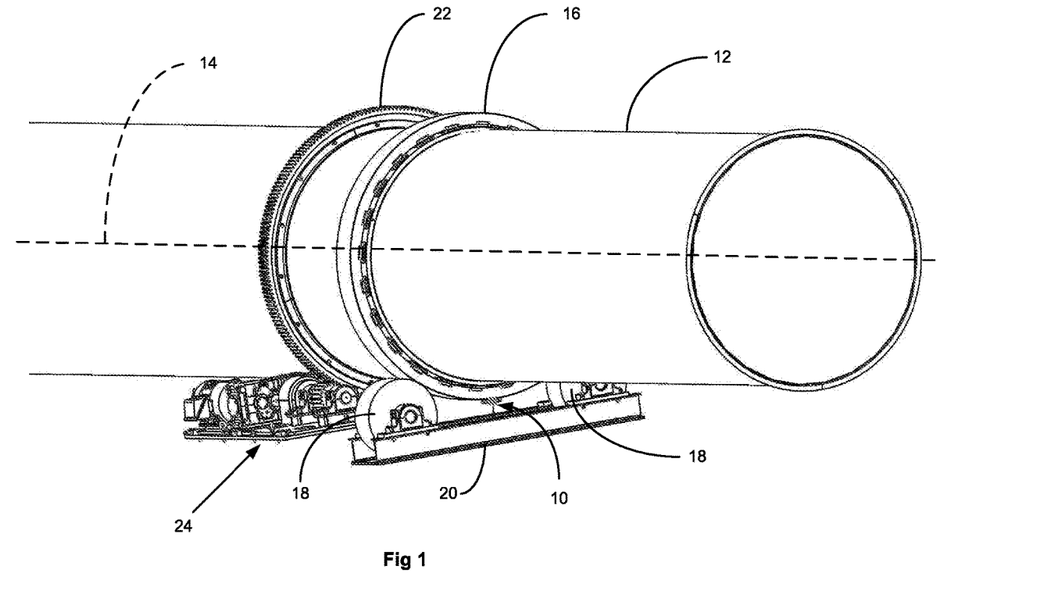
FIG. 1 is a broken-away, perspective view of a large cylindrical drum, such as an industrial rotary dryer, showing a metal tire secured to the drum and supported for rotation on a set of trunnions mounted on a metal foundation, with an embodiment of the tool of the present invention being used to find a point on the foundation directly below the bottom dead center of the tire.

FIGS. 1-6 show an embodiment of a tool 10 used to locate a point on the ground or on the foundation directly beneath the Bottom Dead Center (BDC) of a cylindrical drum 12. Referring to FIG. 1, a large, cylindrical drum 12 (which may be a large industrial dryer or kiln or other type of rotating drum) is supported for rotation about its longitudinal axis 14. The drum 12 includes a first circumferential band 16, which is secured to the outer surface of the drum 12 around its circumference. This band 16 is referred to in the industry as a tire. The tire 16 rests upon a set of rollers or trunnions 18 which are mounted for rotation on a foundation 20. The tool 10 is shown temporarily mounted onto the tire 16, as is explained in more detail below. Only one tire 16 is shown here, but it is understood that there are at least two tires supporting the drum on trunnions, and there may be more tires, depending upon the size and weight of the drum. A second band 22, having a toothed outer surface, is secured to the outer surface of the drum 12 about its circumference, and a drive mechanism 24 engages the teeth of this second band 22 to rotate the drum 12 about its longitudinal axis 14.

The foundation 20 is typically mounted on a concrete pier (not shown) designed to support the operating weight of the drum 12. The foundation 20 is secured to the pier, and the trunnions 18 are adjustably mounted onto the foundation 20. The positions of the trunnions 18 can be adjusted on the foundation 20 to properly align the drum 12 with the foundation 20 (the ground).

Figure 4:
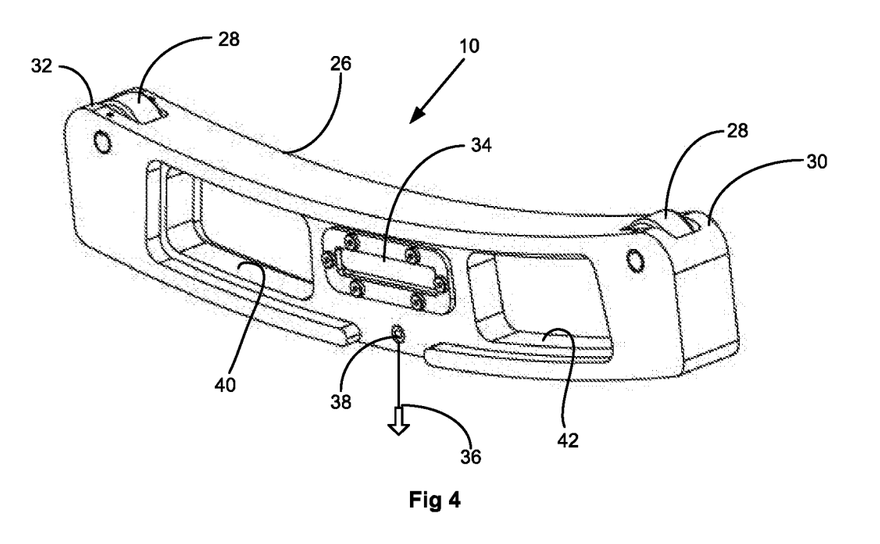
FIG. 4 is a perspective view of the tool of FIGS. 1-3.
Figure 5:
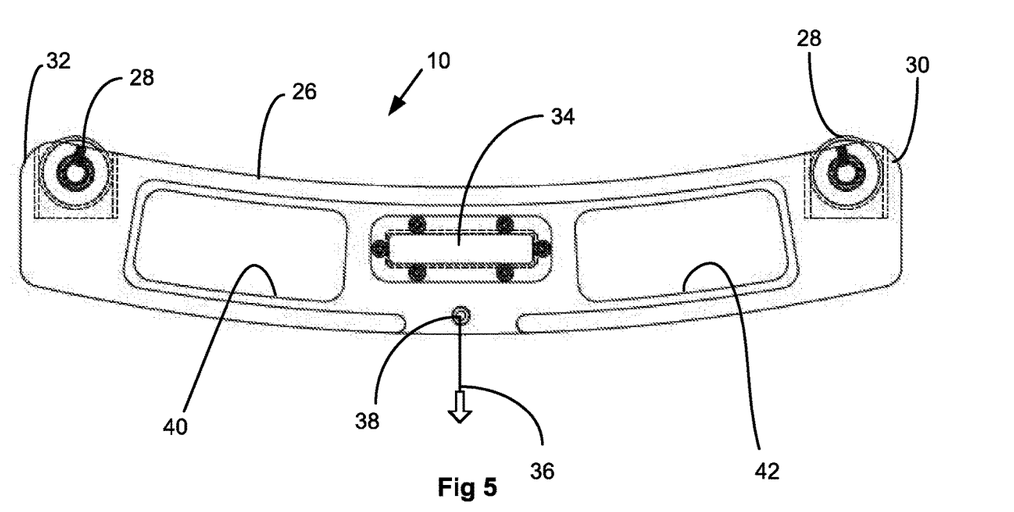
FIG. 5 is a front view of the tool of FIG. 4.
Figure 6:
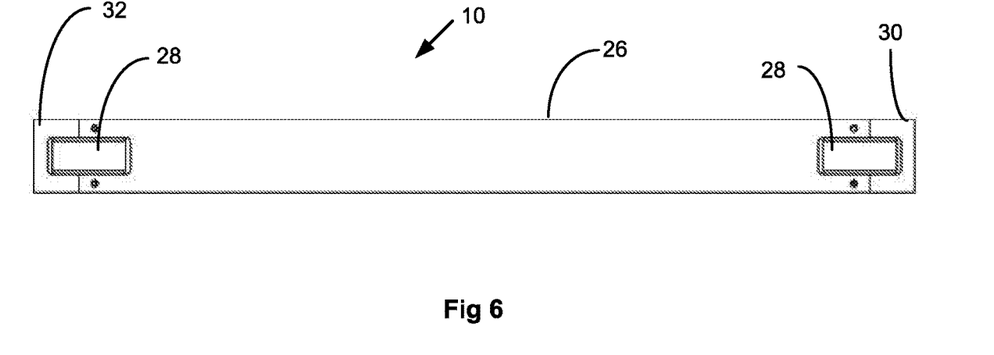
FIG. 6 is a top plan view of the tool of FIG. 4.

Referring to FIGS. 4-6, it can be seen that the tool 10 is an elongated body having a concave top surface 26 with wheels 28 mounted on the body and projecting above the top surface 26 adjacent the ends 30, 32 of the body. In this embodiment, the concave top surface 26 has an arcuate shape, and the body of the tool 10 is a precision machined aluminum piece. The body of the tool 10 could be made from any material but preferably from a non-ferromagnetic material to allow for freer rotation of the wheels 28 as described below.

The wheels 28 are made of machinable rare earth magnetic discs, which allows them to releasably attach to the tire 16 or the drum 12, as explained in more detail later. Each of the wheels 28 mounts on the tool 10 to rotate about a respective axis of rotation. The axes of rotation of the wheels are parallel to each other. A bubble level 34 is secured to the body of the tool 10 and indicates a level position when the axes of rotation of the wheels 28 are level with each other. The bubble level 34 is mounted so that, if the tool 10 is turned upside down, with the wheels 28 of the tool 10 resting atop a flat, horizontal surface, the bubble of the bubble level 34 will be centered in the bubble level. That is, the bubble level visually indicates when the wheels 28 are at the same elevation relative to the horizon. (Other known types of levels could be used instead, if desired.)

A plumb bob 36 is secured to a through opening 38 located at a point of the tool body directly below the midpoint between the axes of rotation of the wheels 28. The plumb bob 36 is a type of pointer, directed away from the top surface of the tool, and identifying a point on the ground that is directly beneath the bottom dead center of the drum when the tool 10 is mounted on the bottom of the drum and is level. Other known types of pointers could be used instead, such as an intensely directed light.

Large through openings 40, 42 are formed in the tool body to reduce the overall weight of the tool 10 and to provide a convenient handle for the user to grasp and move the tool 10, as discussed below.

Figure 2:
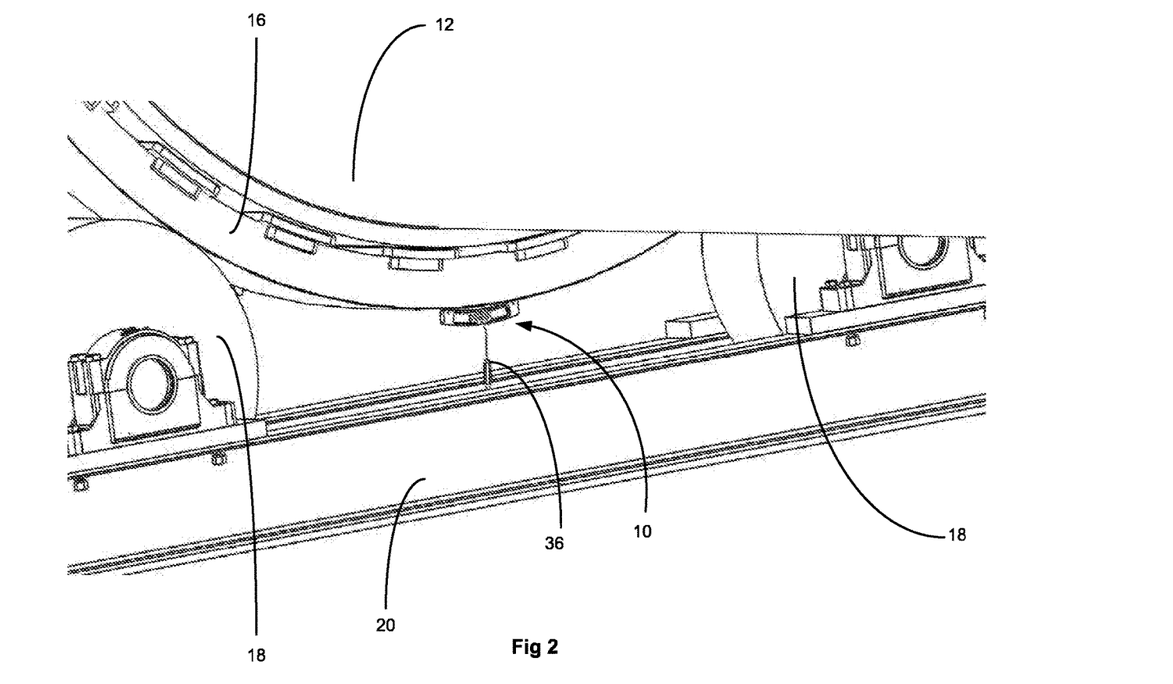
FIG. 2 is an enlarged view of a portion of FIG. 1, showing the tool.
Figure 3:
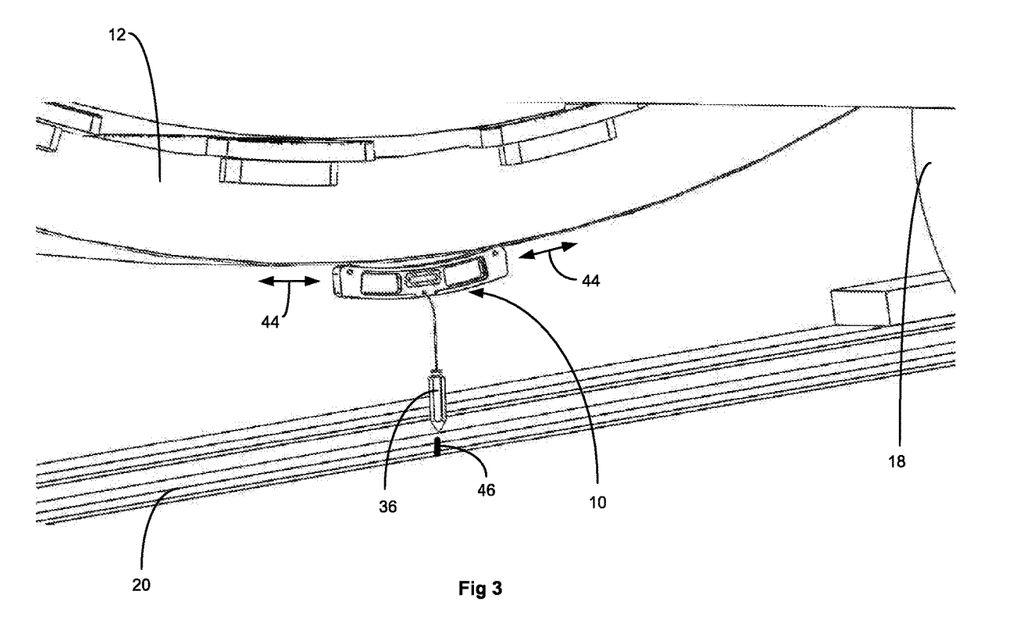
FIG. 3 is an enlarged view of a portion of FIG. 2, showing the tool.

To use the tool 10, the technician places the tool 10 directly below the drum 12 at the portion of the drum to be measured. In this example, the technician places the tool 10 beneath one of the tires 16, as shown in FIGS. 1-3. Since the tires 16 extend only a relatively short axial distance along the drum 12, it is relatively easy to align the tool 10 in a fixed axial position on the drum just by aligning the tool with the tire 16. The wheels 28 of the tool 10 attach magnetically to the tire 16 and hold the tool 10 securely onto the tire 16, with the magnetic force being sufficient to support the weight of the tool 10. However, the wheels 28 can rotate. The technician rolls the tool 10 along the bottom curved profile of the tire 16 with the wheels 28 in contact with the surface of the tire 16 until the tool 10 is level. The concave profile of the top surface 26 of the tool 10 allows the wheels 28 to contact the convex, bottom profile of the drum 12 or tire 16 without the body of the tool 10 interfering with or contacting the bottom of the drum 12.

Looking at FIG. 3, the technician rolls the tool 10 along the circular circumference of the drum 12 or tire 16 in the direction of the arrows 44 until he can visually confirm that the bubble on the bubble level 34 is centered, indicating that the wheels 28 (and the axes of rotation of the wheels 28) are horizontally aligned. At this point, the through opening 38 for securing the plumb bob 36 is directly beneath the Bottom Dead Center of the drum, and the plumb bob 36 is hanging downwardly, directed toward a point on the ground that is directly beneath the Bottom Dead Center of the drum. (If a different type of pointer were being used, such as an intensely directed light beam, then, at this point, the pointer would be pointed directly downwardly below the bottom dead center of the drum 12.) The technician then lowers the plumb bob 36 until the end of the plumb bob 36 is just slightly above the foundation 20 (the ground). When the plumb bob 36 reaches steady state (when it stops swinging), it will be pointing directly downwardly to the point on the foundation 20 that is directly beneath the Bottom Dead Center of the drum 12.

Looking again at FIG. 3, the technician already will have determined and marked (with soapstone, for instance) the point 46 on the foundation 20 that should be directly beneath the bottom dead center of the drum. If the plumb bob 36 or other pointer is not pointing directly at this point 46, the technician will adjust the trunnions 18 as needed until the drum 12 is properly aligned. The technician easily can realign the tool 10 with the drum 12 after each adjustment, moving the tool in the direction of the arrows 44 until the tool is level and the plumb bob 36 or other pointer points to the position on the foundation (or ground) 20 directly below the bottom dead center of the drum 12.

Once the technician aligns the drum 12 at the first tire 16, he then removes the tool and proceeds to align the next tire 16 with the desired point on the foundation (the ground), and so forth, moving lengthwise along the length of the drum 12 until the entire drum 12 is properly aligned with the foundation 20. The technician may go back and double-check the proper alignment of the drum 12 at all of its trunnions 18. Since the tool 10 easily can be moved and its position easily can be adjusted to take a measurement, this process is much simpler and easier than it was in the prior art. Also, since the plumb bob 36 or other pointer points directly to the point on the ground that is directly below bottom dead center of the drum 12, there is no need for the technician to make any additional calculations or measurements to find the point on the ground below the bottom dead center of the drum as was done in the prior art, thereby eliminating additional work and additional opportunities for error.

Figure 7:
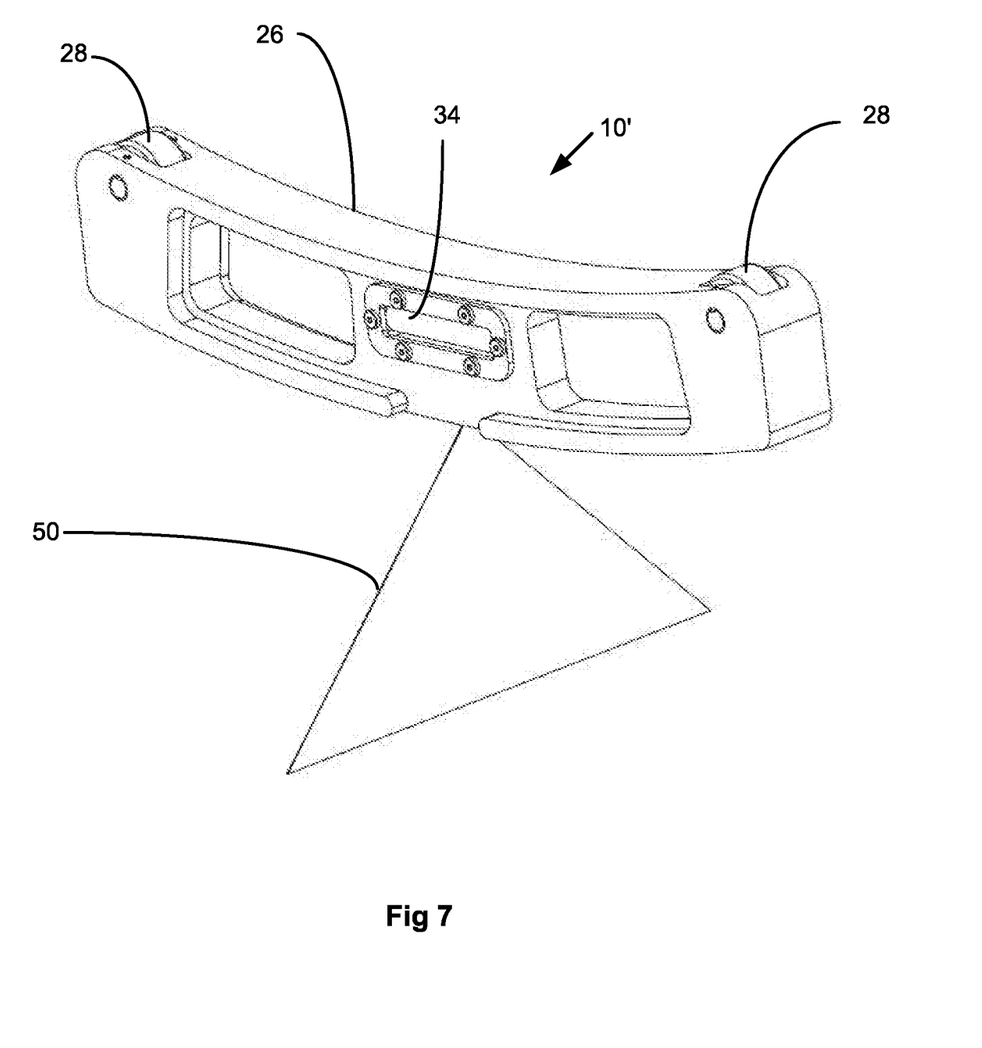
FIG. 7 is a perspective view of a second embodiment of a tool of the present invention.
Figure 8:
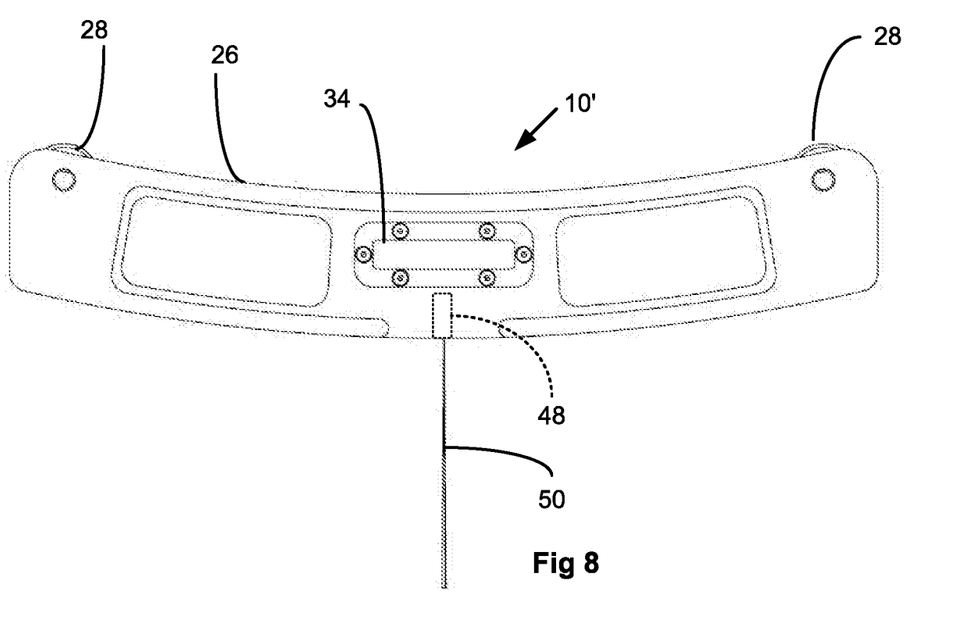
FIG. 8 is a front view of the tool of FIG. 7.
Figure 9:
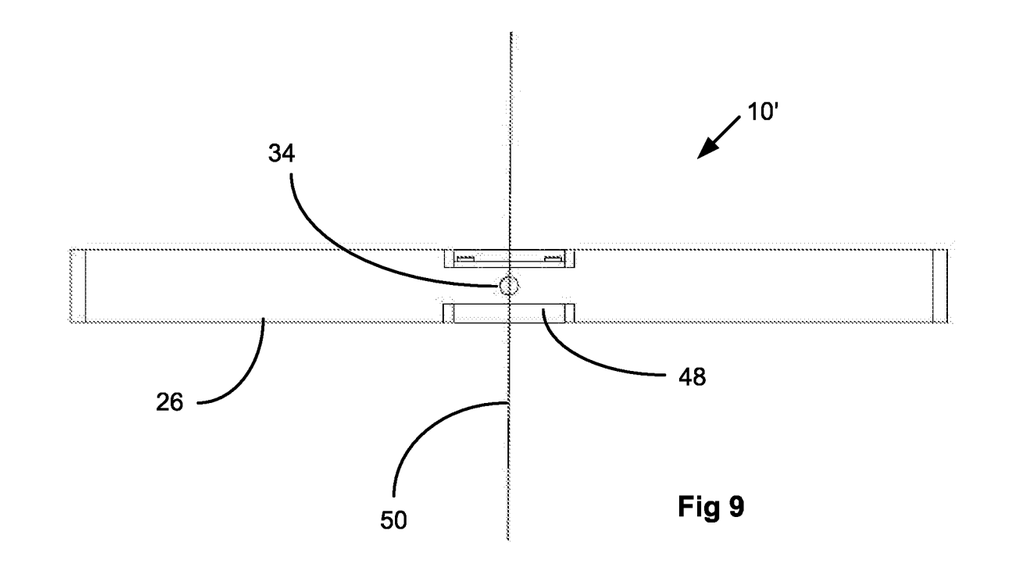
FIG. 9 is a bottom view of the tool of FIG. 7.

FIGS. 7-9 show a second embodiment of a tool 10' used to locate a point on the ground or on the foundation directly beneath the Bottom Dead Center (BDC) of a cylindrical drum 12. This tool 10' is substantially identical to the tool 10 of FIGS. 1-6, except that, instead of using a plumb bob as a pointer, this tool uses a light as a pointer. The light source 48 (See FIGS. 8 and 9) is secured to the tool 10' at a point of the tool body directly below the midpoint between the axes of rotation of the wheels 28. This light source 48 produces a focused beam of light 50, which may form a point of light on the ground or may form a line of light on the ground directly beneath the bottom dead center of the drum 12. The light source 48 may be, for example, a commercially available 5 mW, 532 nm Green Laser pointer or a line laser which is a laser modified to project a line rather than a point (as best shown in FIGS. 7 and 9). The line-shaped projection may be achieved by passing the laser beam through a cylindrical lens, as is known in the industry. In this instance, the projected focused beam generates a line on the ground directly beneath the bottom dead center of the drum 12. That line includes a point directly beneath the bottom dead center of the drum at the tool and extends linearly beyond that point to indicate a line on the ground (a plurality of points) that is directly below the bottom dead center of the drum 12 extending for an axial distance beyond the tool. Other than this change of pointers, this tool 10' is used in the same manner as the tool 10 described earlier.

It will be obvious to those skilled in the art that modifications may be made to the embodiments described above without departing from the scope of the invention as claimed.

What is claimed is:

1. A tool for finding a point on the ground directly beneath the bottom dead center of a rotatable drum, comprising:
   a body having a top surface and defining first and second ends;
   first and second wheels rotatably mounted on said body adjacent to said first and second ends, respectively, said first and second wheels projecting above said top surface, said first and second wheels being made of a magnetized material that is strong enough that said first and second wheels can magnetically support the weight of said body;
   a level mounted on said body; and
   a pointer mounted on said body and directed downwardly, away from said top surface, to define a point on the ground.

2. A tool for finding a point on the ground directly beneath the bottom dead center of a rotatable drum as recited in claim 1, wherein said first and second wheels are mounted to rotate about first and second axes of rotation, respectively, and wherein the level mounted on said body indicates that it is level when the first and second axes of rotation are level.

3. A tool for finding a point on the ground directly beneath the bottom dead center of a rotatable drum as recited in claim 2, wherein said level is a bubble level.

4. A tool for finding a point on the ground directly beneath the bottom dead center of a rotatable drum as recited in claim 1, wherein said pointer is a plumb bob.

5. A tool for finding a point on the ground directly beneath the bottom dead center of a rotatable drum as recited in claim 1, wherein said pointer is a light.

6. A tool for finding a point on the ground directly beneath the bottom dead center of a rotatable drum as recited in claim 3, wherein said pointer is a plumb bob.

7. A tool for finding a point on the ground directly beneath the bottom dead center of a rotatable drum as recited in claim 3, wherein said pointer is a light.

8. A tool for finding a point on the ground directly beneath the bottom dead center of a rotatable drum as recited in claim 5, wherein said pointer is a light which produces a linear beam.

9. A tool for finding a point on the ground directly beneath the bottom dead center of a rotatable drum as recited in claim 7, wherein said pointer is a light which produces a linear beam.

10. A method for finding a point on the ground directly beneath the bottom dead center of a rotatable drum, comprising the steps of:
   hanging a tool from the bottom of said drum using magnetic wheels rotatably mounted on said tool, wherein said magnetic wheels are magnetically attracted to said drum with a magnetic force that is sufficient to support the weight of said tool;
   rolling said tool along the bottom of a tire supporting said drum, until said tool is level according to a level mounted on said tool; and
   directing a pointer downwardly from said tool to define a point on the ground that is directly beneath the bottom dead center of the drum.

11. A method for finding a point on the ground directly beneath the bottom dead center of a rotatable drum as recited in claim 10, wherein said pointer is a plumb bob.

12. A method for finding a point on the ground directly beneath the bottom dead center of a rotatable drum as recited in claim 10, wherein said pointer is a light.

13. A method for finding a point on the ground directly beneath the bottom dead center of a rotatable drum as recited in claim 12, wherein said light produces a linear beam to define a line on the ground extending directly beneath the bottom dead center of the rotatable drum.

\* \* \* \* \*